US012691853B2

(12) United States Patent
Wang et al.

(10) Patent No.: US 12,691,853 B2
(45) Date of Patent: Jul. 28, 2026

(54) BRAKING SUPPORT CONTROL DEVICE

(71) Applicant: Hitachi Astemo, Ltd., Hitachinaka (JP)

(72) Inventors: Jian Wang, Tokyo (JP); Taku Takahama, Tokyo (JP)

(73) Assignee: Hitachi Astemo, Ltd., Ibaraki (JP)

( * ) Notice: Subject to any disclaimer, the term of this patent is extended or adjusted under 35 U.S.C. 154(b) by 10 days.

(21) Appl. No.: 18/845,629

(22) PCT Filed: Aug. 24, 2022

(86) PCT No.: PCT/JP2022/031918
§ 371 (c)(1),
(2) Date: Sep. 10, 2024

(87) PCT Pub. No.: WO2023/188453
PCT Pub. Date: Oct. 5, 2023

(65) Prior Publication Data
US 2025/0187569 A1     Jun. 12, 2025

(30) Foreign Application Priority Data

Mar. 31, 2022     (JP) ................................. 2022-058595

(51) Int. Cl.
B60T 7/22          (2006.01)
(52) U.S. Cl.
CPC ........... B60T 7/22 (2013.01); B60T 2201/022 (2013.01)
(58) Field of Classification Search
CPC .. B60T 7/22; B60T 7/17558; B60T 2201/022; B60W 60/0015;

(Continued)

(56) References Cited

U.S. PATENT DOCUMENTS 6,324,458 B1 * 11/2001 Takagi .............. B60W 30/1819
180/197
10,928,820 B1 * 2/2021 Tao ................... B60W 50/0097
(Continued)

FOREIGN PATENT DOCUMENTS

| JP | 2012-183868 A | 9/2012 |
| JP | 2014-222462 A | 11/2014 |
| JP | 2021-068013 A | 4/2021 |

OTHER PUBLICATIONS

International Search Report, International Patent Application No. PCT/JP2022/031918, Nov. 15, 2022.

*Primary Examiner* — George C Jin
(74) *Attorney, Agent, or Firm* — Volpe Koenig

(57)          ABSTRACT

An object of the present invention is to obtain a braking assistance control device capable of preventing sudden brake in a case where accuracy of future prediction is high and preventing malfunctions in a case where accuracy of future prediction is low by changing an appropriate control characteristic according to the accuracy of future prediction. A braking assistance control device of the present invention is a device that performs braking assistance control of an own vehicle according to a possibility of collision between the own vehicle and an obstacle, and includes an index calculating unit that calculates an index for defining accuracy of future prediction of relative information between the own vehicle and the obstacle, and a threshold value setting unit that changes a threshold value for determining whether or not to perform the braking assistance control according to the index.

12 Claims, 8 Drawing Sheets

(58) Field of Classification Search
    CPC ......... B60W 2520/10; B60W 2540/10; B60W 2540/12; B60W 2540/18; B60W 2540/20; G06V 20/597
    See application file for complete search history.

(56)         References Cited

U.S. PATENT DOCUMENTS

| | | |
|---|---|---|
| 2014/0343750 A1 | 11/2014 | Minemura et al. |
| 2021/0114629 A1 | 4/2021 | Komuro |
| 2023/0322214 A1* | 10/2023 | Katayama ......... B60W 30/0956 |
| | | 701/301 |

\* cited by examiner

*FIG. 7*

| DETERMINATION ORDER | DETERMINATION METHOD (INPUT) BY DRIVER MONITOR ETC. | CORRESPONDING DRIVER STATE | OCCURRENCE DEGREE (OUTPUT) OF DRIVER OPERATION |
|---|---|---|---|
| 1 | · TURN STEERING WHEEL<br>· DEPRESS ACCELERATOR<br>· DEPRESS BRAKE<br>· OPERATE DIRECTION INDICATOR | DURING DRIVING OPERATION | 100% |
| 2 | · TOUCHING STEERING HANDLE | MAY BE PERFORMING DRIVING OPERATION | 75% |
| 3 | · HAND IS CLOSE TO STEERING WHEEL<br>· HAND APPROACHES STEERING WHEEL<br>· HAND IS CLOSE TO DIRECTION INDICATOR<br>· FOOT IS ABOUT TO DEPRESS PEDAL | DRIVING OPERATION IS NOT YET PERFORMED<br>ABOUT TO PERFORM DRIVING OPERATION | 50% |
| 4 | · INATTENTION<br>· DOZING<br>· MANUAL OPERATION SUCH AS SMARTPHONE OPERATION AND READING | NOT PERFORMING DRIVING OPERATION | 0% |

FIG. 10

$$\text{SENSOR DETECTION PERFORMANCE} = 1 - \frac{\text{VARIANCE OF SENSOR VALUE}}{\text{ALLOWABLE VALUE OF VARIANCE}} \quad \cdots (1)$$

FIG. 11

$$\begin{array}{l}\text{INDEX FOR DEFINING} \\ \text{ACCURACY OF} \\ \text{FUTURE PREDICTION}\end{array} = \text{TRAVEL CONTROL PERFORMANCE} * \kappa + \text{SENSOR DETECTION PERFORMANCE} * (1 - \kappa) \quad \cdots (2)$$

(WHERE $\kappa$ IS AN APPROPRIATE POSITIVE COEFFICIENT OF LESS THAN ONE.)

FIG. 12

$$TTC = \frac{d}{V_{rel}} \quad \cdots (3)$$

(WHERE $d$ IS A RELATIVE DISTANCE [m] IN A FRONT-REAR DIRECTION OF OWN VEHICLE BETWEEN OWN VEHICLE AND OBSTACLE, AND $V\_rel$ REPRESENTS A RELATIVE SPEED [m/s] BETWEEN OWN VEHICLE AND OBSTACLE.)

FIG. 13

$$Gcmd = \frac{V^2}{2d} \quad \cdots (4)$$

(WHERE $v$ IS A TRAVELING SPEED [m/s] OF OWN VEHICLE, AND $d$ IS RELATIVE DISTANCE [m] IN A FRONT-REAR DIRECTION OF OWN VEHICLE BETWEEN OWN VEHICLE AND OBSTACLE.)

FIG. 14

$$\begin{array}{l}\text{INDEX FOR DEFINING} \\ \text{ACCURACY OF} \\ \text{FUTURE PREDICTION}\end{array} = (1 - \text{OCCURRENCE DEGREE OF DRIVER OPERATION}) * \lambda + \text{TRAVEL CONTROL PERFORMANCE} * \kappa + \text{SENSOR DETECTION PERFORMANCE} * (1 - \lambda - \kappa) \quad \cdots (5)$$

(WHERE $\lambda$, $\kappa$ ARE APPROPRIATE POSITIVE COEFFICIENTS OF LESS THAN ONE, AND SATISFY RELATIONSHIP OF $1 > \lambda + \kappa$.)

BRAKING SUPPORT CONTROL DEVICE

TECHNICAL FIELD

The present invention relates to a braking assistance control device.

BACKGROUND ART

PTL 1 discloses a technique of a vehicle traveling control system that sets a first risk region in a case where a deviation between a recognized position of a moving object and a predicted future position is small, sets a relatively large second risk region in a case where the deviation is large, determines whether or not the moving object collides with an own vehicle, and activates autonomous emergency braking (AEB; collision damage mitigation brake).

CITATION LIST

Patent Literature

PTL 1: Japanese Patent Application Laid-Open No. 2021-68013

SUMMARY OF INVENTION

Technical Problem

In the related art, in order to avoid damaging accidents, there are many cases focusing on prevention of inactivation and prevention of malfunction of the AEB, but during automatic driving, a degree of freedom in the posture and action of an occupant in the vehicle is high, and reduction in the possibility of an in-vehicle accident due to emergency brake is not mentioned.

The present invention has been made in view of the above points, and an object of the present invention is to solve a problem of reducing an accident rate inside and outside a vehicle by realizing an AEB dedicated to autonomous driving AD (Autonomous Driving).

Solution to Problem

A braking assistance control device of the present invention that solves the above problem is a braking assistance control device that performs a braking assistance control of an own vehicle according to a possibility of collision between the own vehicle and an obstacle, the braking assistance control device including an index calculating unit that calculates an index for defining accuracy of future prediction of relative information between the own vehicle and the obstacle; and a threshold value setting unit that sets a threshold value for determining whether or not to perform the braking assistance control according to the index.

According to the present invention, for example, an index for defining accuracy of future prediction is calculated using characteristics unique to autonomous driving such as recognition of future driving operation without driver's operation, and as the index becomes higher, a threshold value for determining braking operation for collision avoidance is set to a value corresponding to early activation, whereby collision can be avoided with weaker braking force than in a case where the index is low, and an in-vehicle accident caused by sudden brake can be prevented.

Advantageous Effects of Invention

According to the present invention, it is possible to prevent inactivation and sudden brake of the AEB in a case where accuracy of future prediction is high and to prevent malfunction in a case where accuracy of future prediction is low by changing an appropriate control characteristic according to the accuracy of future prediction.

Further features related to the present invention will become apparent from the description of the present specification and the accompanying drawings. Problems, configurations, and effects other than those described above will become apparent by the following description of the embodiments.

BRIEF DESCRIPTION OF DRAWINGS

FIG. 7 is a table illustrating a derivation example of an occurrence frequency of a driver operation.

FIG. 10 is a diagram illustrating a derivation expression of the sensor detection performance.

FIG. 11 is a diagram illustrating a calculation formula of an index for defining accuracy of future prediction according to the first embodiment.

FIG. 12 is a diagram illustrating a calculation formula of a collision time.

FIG. 13 is a diagram illustrating a calculation formula of a braking G command Gcmd.

FIG. 14 is a diagram illustrating a calculation formula of an index for defining accuracy of future prediction according to a second embodiment.

DESCRIPTION OF EMBODIMENTS

Next, embodiments of the present invention will be described in detail with reference to the drawings.

First Embodiment

Figure 1:
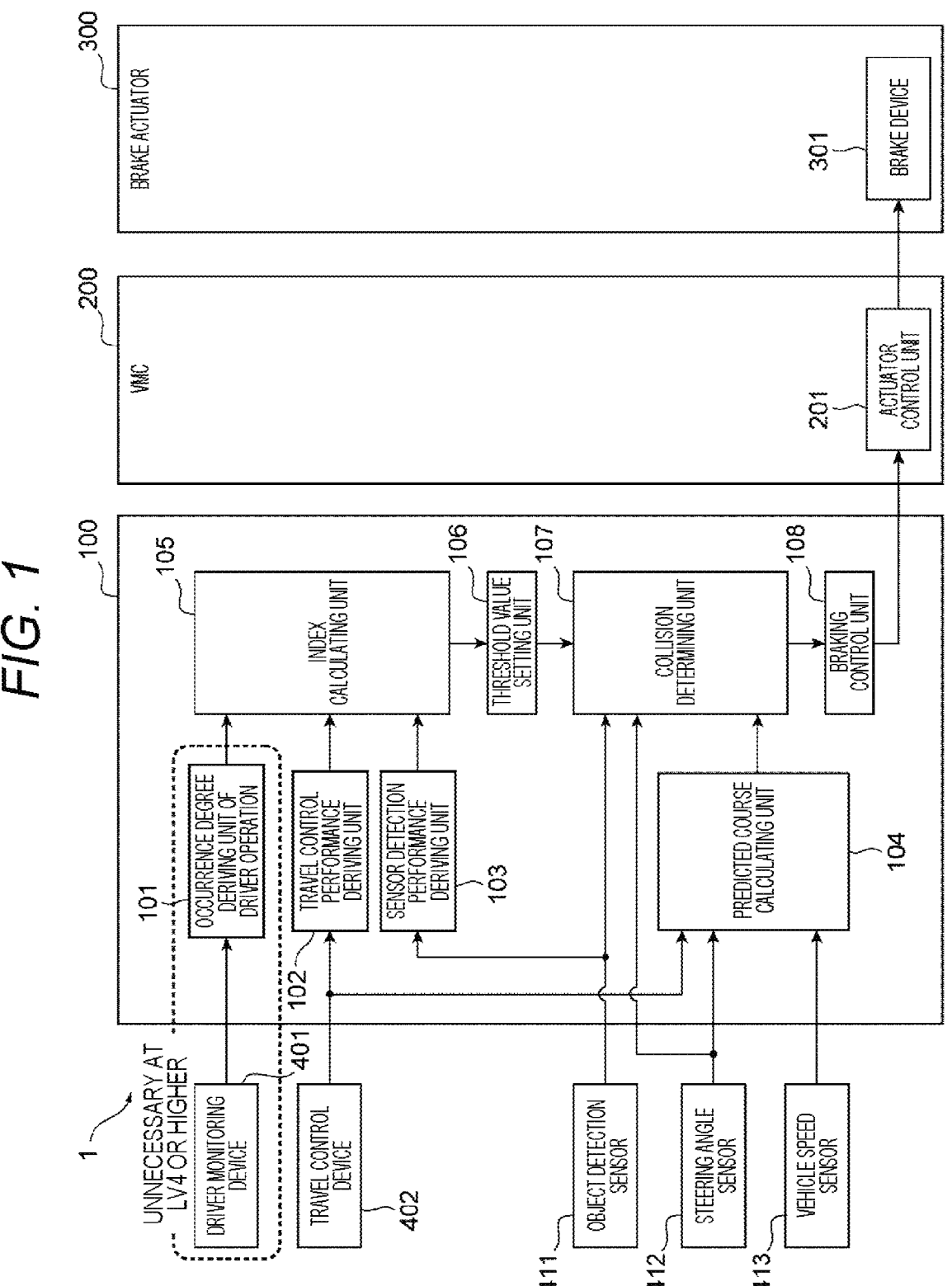
FIG. 1 is a block diagram of a vehicle traveling system according to a first embodiment.

FIG. 1 is a block diagram of a vehicle traveling system according to a first embodiment.

The vehicle traveling system 1 of the present embodiment is a system that performs autonomous driving AD of an own vehicle such as an automobile, and for example, the autonomous driving level is level 3, that is, conditional autonomous driving in which there is a driver who can respond to an intervention request from the system, and level 4 or higher are further included.

The vehicle traveling system 1 includes a braking assistance control device 100, a vehicle motion controller (VMC) 200, and a brake actuator 300. The braking assistance control device 100 and the VMC 200 are configured by an in-vehicle ECU having a CPU and a memory. The VMC 200 includes, as an internal function thereof, an actuator control unit 201 that performs engine control, steering control, and brake control of the own vehicle. When receiving the braking G command from the braking assistance control device 100, the actuator control unit 201 outputs a control signal to the brake actuator 300. The brake actuator 300 includes a brake device 301 that receives a control signal from the actuator control unit 201 and performs brake control based on the control signal.

The braking assistance control device 100 performs braking assistance control of the own vehicle according to the possibility of collision between the own vehicle and an obstacle. A driver monitoring device 401, a travel control device 402, an object detection sensor 411, a steering angle sensor 412, and a vehicle speed sensor 413 are connected to the input side of the braking assistance control device 100.

The driver monitoring device 401 monitors an occupancy state of the driver in the own vehicle by, for example, information on an operation state of a steering wheel, an accelerator pedal, a brake pedal, and a direction indicator by the driver, information detected by a camera, an infrared sensor, or the like attached to the vehicle interior, or the like. As the occupancy state, for example, it is possible to detect the presence or absence of the hands-off or the eye-off of the driver, more specifically, the position or movement of the hand or the foot of the driver in the own vehicle, the presence or absence of an operation, inattention, doze, the presence or absence of an operation or reading of the mobile terminal, and the like.

The travel control device 402 is constituted by an in-vehicle ECU, and performs autonomous driving control for driving the own vehicle along a target trajectory planned based on, for example, map information or position information and moving the own vehicle to a destination. In addition, the travel control device 402 performs control for smoothly transferring driving to the driver when the driver intervenes by requesting the driver to intervene in driving or when the driver intervenes in driving by his/her own will.

The object detection sensor 411 is a sensor that detects an object around the own vehicle, and for example, at least one of a monocular camera, a stereo camera, a sonar, an infrared sensor, a radar, or a LiDAR can be used. The steering angle sensor 412 detects the steering angle of the steering wheel of the own vehicle, and the vehicle speed sensor 413 detects the vehicle speed from the rotation speed of the wheel of the own vehicle or the like.

The braking assistance control device 100 is mounted on an in-vehicle electronic control unit (ECU) which is an AD controller, and controls the AEB. The braking assistance control device 100 includes, as internal functions, an occurrence degree deriving unit 101 for driver operation, a travel control performance deriving unit 102, a sensor detection performance deriving unit 103, a predicted course calculating unit 104, an index calculating unit 105, a threshold value setting unit 106, a collision determining unit 107, and a braking control unit 108. In the braking assistance control device 100, detection of an obstacle and calculation of a predicted course of the own vehicle are performed, determination is made on the possibility of collision between the own vehicle and the obstacle, determination on the start of braking is made using the collision time TTC or the like when it is determined that the own vehicle collides with the obstacle, where when determined to start braking, a process of calculating a braking G command necessary for collision avoidance and outputting the braking G command to the VMC 200 is performed.

The occurrence degree deriving unit 101 of the driver operation derives the occurrence degree of the driver operation by using information such as information on an actual operation by the driver detected by the driver monitoring device 401 or the like, or information such as operation expectation in which an operation is expected. However, when the autonomous driving level is level 4 or higher, driving without a driver is enabled (brain-off), so that the driver monitoring device 401 and the occurrence degree deriving unit 101 of the driver operation are unnecessary.

The travel control performance deriving unit 102 derives the travel control performance of the own vehicle by using information such as the current and target state (one or more of position, speed, acceleration, etc.) of the own vehicle. For example, when the absolute value of the difference between the actual position of the own vehicle and the target position (position on the target trajectory) is smaller than the threshold value, a high value is derived as the travel control performance (see FIG. 3).

The sensor detection performance deriving unit 103 derives the sensor detection performance by using the information on the dispersion state of the sensor value of the object detected by the object detection sensor 411. For example, when the same object is detected a plurality of times, as the variation in the object width is smaller, the variance of the sensor value is smaller, and a higher value is derived as the sensor detection performance (see FIG. 4).

The predicted course calculating unit 104 calculates a predicted course of the own vehicle based on information on the current position and the target position of the own vehicle and information on the steering angle and the vehicle speed of the own vehicle.

The index calculating unit 105 derives an index for defining the accuracy of future prediction of relative information of the own vehicle and the obstacle based on at least one of information on the occurrence degree of the driver operation, the travel control performance, and the sensor detection performance. Here, the relative information is, for example, information calculated based on the detection information of an object detection sensor that detects an object around the own vehicle, and includes at least one of a relative position, a relative speed, and a relative acceleration between the own vehicle and the object. Furthermore, the future prediction includes at least one of a position, a speed, and an acceleration predicted at a future predetermined time of the own vehicle and the obstacle, and the accuracy indicates a difference between the position, the speed, and the acceleration at an actual predetermined time by a degree (%).

The threshold value setting unit 106 sets a threshold value for determining whether or not to perform the braking assistance control of the AEB according to an index that determines the accuracy of future prediction. The threshold value setting unit 106 can set a plurality of activation threshold values for activating the AEB according to an index for defining the accuracy of the future prediction. As the accuracy of the future prediction becomes higher, the threshold value setting unit 106 sets the determination threshold value for starting braking of the AEB in the braking assistance control to a value corresponding to early activation.

The collision determining unit 107 performs an object determination on whether or not an object detected by the object detection sensor 411 is an obstacle. Then, when the object is determined to be an obstacle, the possibility of collision is determined from the predicted course of the own vehicle and the behavior of the detected object.

When the collision determining unit 107 determines that there is a possibility of collision, the braking control unit 108 performs a process of determining the start of braking of the AEB by using the time until collision or the like and calculating a braking G command necessary for collision avoidance.

Next, the operation content of the braking assistance control device 100 in the present embodiment will be described using the flowchart of FIG. 2.

The present embodiment is an example of a case where the own vehicle having an autonomous driving level of Level 3 (Lv3) or higher needs to perform emergency avoidance by the AEB while traveling on a highway with a relatively large traffic.

Figure 2:
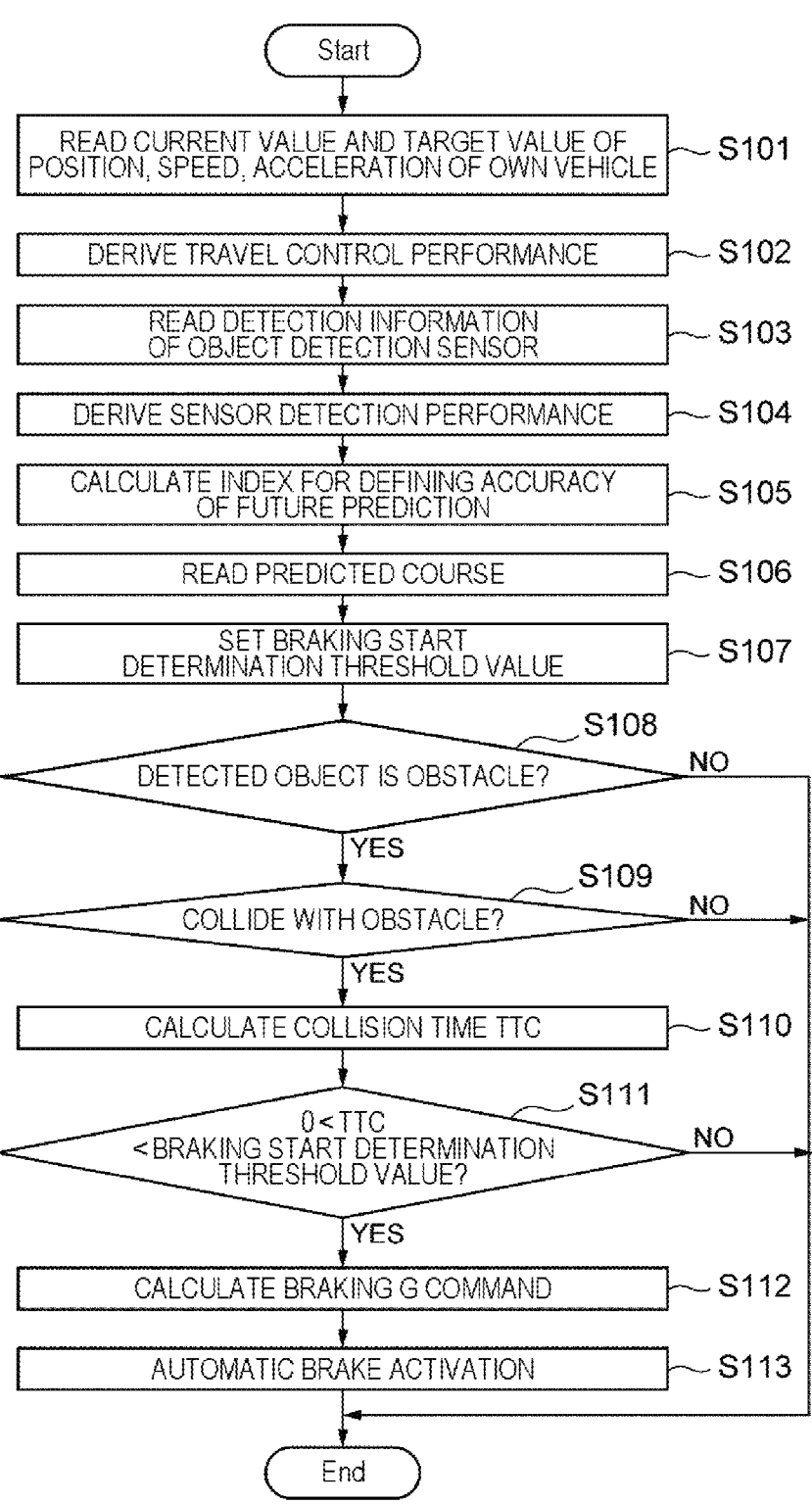
FIG. 2 is a flowchart for explaining an operation content of a braking assistance control device of the first embodiment.

FIG. 2 is a processing flow of the braking assistance control by the braking assistance control device of the present embodiment.

The process of the braking assistance control by the braking assistance control device of the present embodiment is performed in a program cycle once every 50 ms in the in-vehicle ECU which is an AD controller.

First, in S101, current values and target values of the position, speed, and acceleration of the own vehicle are read. In S102, the travel control performance (%) of the own vehicle is derived using the current value and the target value (one or more of position, speed, acceleration, etc.) of the own vehicle read in S101. The information of the target value is acquired from a preset travel plan.

Figure 3:
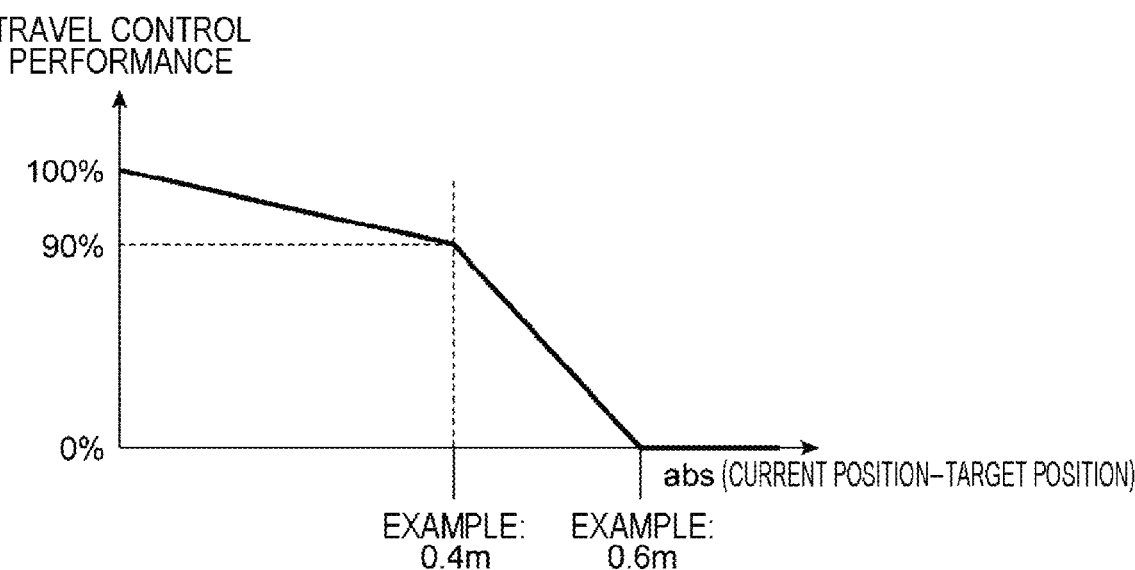
FIG. 3 is a diagram for explaining a derivation example of travel control performance.

FIG. 3 is a diagram for explaining a derivation example of the travel control performance. In FIG. 3, the vertical axis represents the travel control performance, and the horizontal axis represents the absolute value of the difference between the current position and the target position of the own vehicle.

The travel control performance is derived by the travel control performance deriving unit 102. As illustrated in FIG. 3, the travel control performance is set such that the travel control performance becomes lower as the absolute value of the difference between the current position and the target position of the own vehicle increases, and a higher value is derived as the travel control performance as the absolute value of the difference decreases.

In the example illustrated in FIG. 3, the difference between the current position and the target position of the own vehicle up to 0.4 m is considered to be a normal error range generated in the autonomous driving control, and thus the travel control performance is set to relatively slowly decrease as the difference increases. On the other hand, the difference between the current position and the target position of the own vehicle greater than or equal to 0.4 m exceeds the normal error range, and thus the travel control performance is set to rapidly decrease as the difference increases. When the difference is greater than or equal to 0.6 m, the travel control performance is set to be 0%.

In S103, detection information of the object detection sensor 411 is read. Here, detection information (relative position, relative speed, lateral width, and type) of an object around the own vehicle detected by the object detection sensor 411 are read.

In S104, the sensor detection performance is derived using the detection information of the object detection sensor 411 read in S103. The sensor detection performance is derived by the sensor detection performance deriving unit 103.

Figure 4:
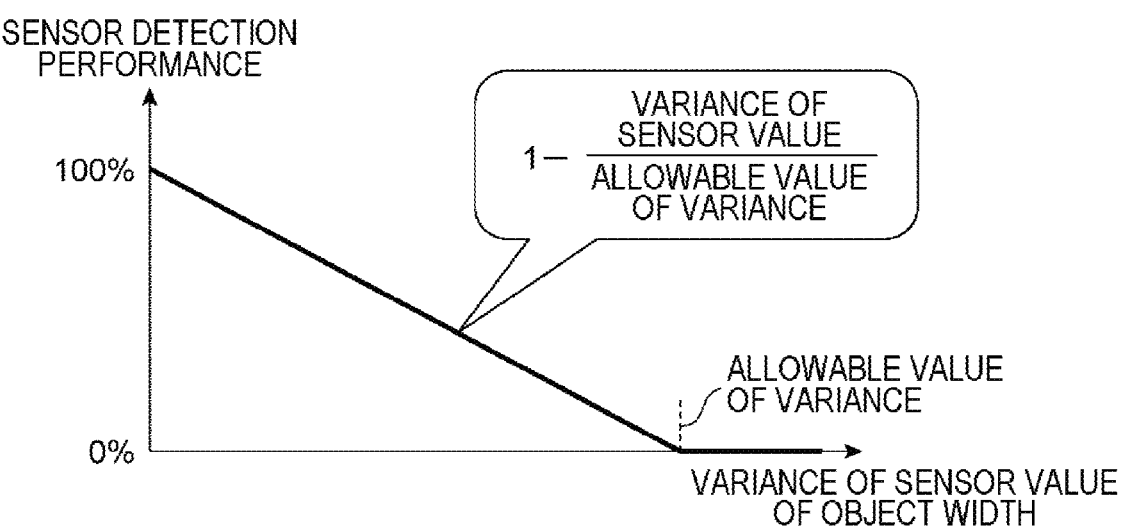
FIG. 4 is a diagram for explaining a derivation example of sensor detection performance.

FIG. 4 is a diagram for explaining a derivation example of sensor detection performance.

The sensor detection performance is set to become lower as the variance of the sensor value of the object width becomes higher, as illustrated in the graph of FIG. 4 and the formula (1) of FIG. 10.

In S105, an index for defining the accuracy of the future prediction is calculated. The index for defining the accuracy of the future prediction is calculated by the index calculating unit 105. The index calculating unit 105 calculates an index based on the occurrence degree of the driver operation, the travel control performance, and the sensor detection performance. The index calculating unit 105 calculates a higher index as the accuracy of the future prediction becomes higher. For example, as shown in formula (2) of FIG. 11, the index calculating unit 105 calculates the index by weighting the travel control performance derived in S102 and the sensor detection performance derived in S104.

Next, in S106, a predicted course of the own vehicle is read. The predicted course of the own vehicle is calculated by the predicted course calculating unit 104.

Figure 5:
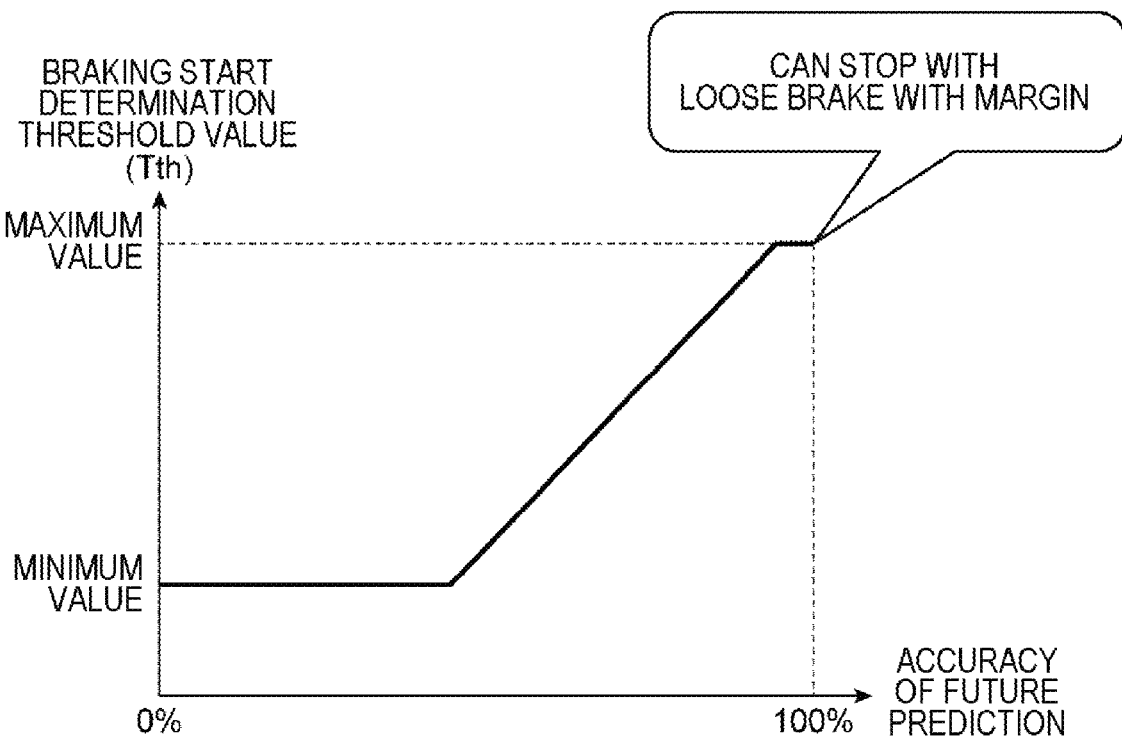
FIG. 5 is a diagram for explaining a setting example of a braking start determination threshold value.
Figure 6:
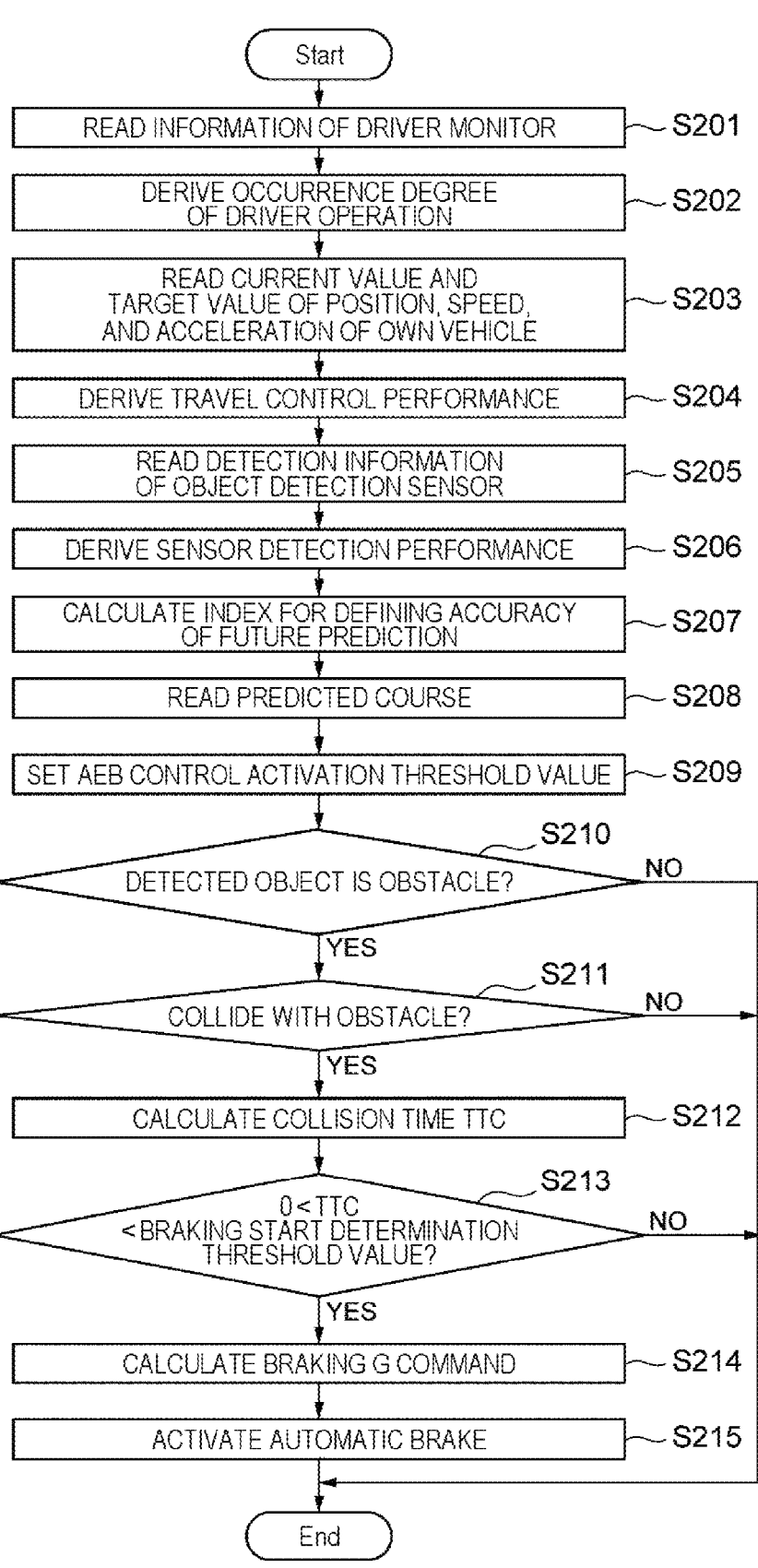
FIG. 6 is a flowchart for explaining an operation content of a travel control system according to a second embodiment.

Then, in S107, the braking start determination threshold value Tth is set. For example, as illustrated in FIG. 5, the threshold value setting unit 106 increases the braking start determination threshold value Tth as the index for the accuracy of the future prediction becomes higher. When the braking start determination threshold value Tth is increased, the AEB can be actively activated at an early stage, and the braking force of the AEB can be weakened accordingly. Therefore, the own vehicle can be stopped with a loose brake with a margin, and an in-vehicle accident can be suppressed. On the other hand, the braking start determination threshold value Tth is decreased as the index for defining the accuracy of the future prediction becomes lower. When the braking start determination threshold value Tth is decreased, the start of the activation of the AEB is delayed, and the activation is performed after the vehicle approaches the object, so that the malfunction of the AEB can be prevented.

For example, at the own vehicle speed V=11.1 [m/s], when the average braking deceleration in a case where the index for defining the accuracy of the future prediction is the lowest is $G\_avg=6.9$ [m/s$^2$], the braking start determination threshold value is set to Tth=0.81 seconds [s], and when the average braking deceleration in a case where the index for defining the accuracy of the future prediction is the highest is $G\_avg=3.9$ [m/s2], the braking start determination threshold value is set to Tth=1.42 seconds [s].

In S108, whether or not the detected object is an obstacle is determined using the object information (relative position, relative speed, lateral width, and type) read in S103 (obstacle determining unit). In a case where the object is determined to be an obstacle, the process proceeds to S109, and in a case where the object is determined as not an obstacle, the present flow is ended. In the determination as to whether or not the object is an obstacle, for example, the object is determined to be an obstacle when the relative position is within a preset range.

In S109, whether or not the own vehicle collides with an obstacle is determined using the object information read in S103 and the predicted course of the own vehicle read in S106. In a case where it is determined that there is collision, the process proceeds to the process of S110, and in a case where it is determined that there is no collision, the present flow is ended.

In S110, the collision time TTC [s] is calculated. The collision time TTC can be calculated by, for example, formula (3) illustrated in FIG. 12.

In S111, whether or not the collision time TTC calculated in S110 is greater than 0 and less than the braking start determination threshold value Tth[s] set in S107 is determined, where when it is determined that the collision time TTC is less than the braking start determination threshold value Tth[s], the process proceeds to S112 and when it is determined that the collision time TTC is greater than the braking start determination threshold value Tth[s], the present flow is ended.

In S112, a necessary braking G command Gcmd [m/s²] is calculated in order to avoid the own vehicle from colliding with the obstacle. The braking G command Gcmd can be calculated by, for example, formula (4) illustrated in FIG. 13.

When the index for defining the accuracy of the future prediction is high, the braking start determination threshold value Tth is set to a lower value in S107, and thus as compared with the case where the index is low, the early activation of the AEB is performed, and the value of the relative distance d between the own vehicle and the obstacle in the front-rear direction of the own vehicle increases. Therefore, the braking G command Gcmd becomes a smaller value, that is, the sudden braking can be avoided.

In S113, in order to activate the automatic brake, the braking G command calculated in S112 is transmitted to the brake actuator 300.

For example, since the route of the own vehicle can be grasped during the autonomous driving, the index for defining the accuracy of the future prediction becomes higher than that during the driver operation. According to the braking assistance control device 100 of the present embodiment, when the index indicating the accuracy of the future prediction is high during the autonomous driving of the own vehicle, the threshold value of the braking start determination is set so as to activate the AEB early, and thus in S112, the braking G command Gcmd smaller than usual is calculated, the vehicle can be stopped with a loose brake with a margin, and an in-vehicle accident due to sudden brake can be prevented.

On the other hand, since it is difficult to predict the route of the own vehicle during the driver operation, the index for defining the accuracy of the future prediction becomes low. According to the braking assistance control device 100 of the present embodiment, when the accuracy of the future prediction is low due to the driver operation, the threshold value of the braking start determination is set so that the start of activation of the AEB is delayed. Therefore, the AEB can be activated after approaching the object, and malfunction can be prevented.

Second Embodiment

Next, a second embodiment of the present invention will be described.

The present embodiment is an example of a case where the own vehicle having an autonomous driving level of Level 3 (Lv3) or higher needs to perform emergency avoidance by the AEB while traveling on a highway with a relatively large traffic. In the case of the present embodiment, since the autonomous driving level of the own vehicle is level 3, there is a possibility that the driver intervenes during the autonomous driving to perform an operation by the driver.

In the present embodiment, the occurrence degree of the driver operation is derived in order to consider the disturbance caused by the driver operation with respect to the travel trajectory plan of the autonomous driving (S202).

Then, the threshold value setting unit 106 sets at least one of a plurality of determination threshold values set for determining whether or not to perform the braking assistance control according to the index. In the present embodiment, a determination threshold value of an obstacle and a determination threshold value of a collision possibility are also set according to an index for defining the accuracy of future prediction (S209).

The process of the present embodiment is performed in a program cycle once every 50 ms in an in-vehicle ECU that is an AD controller.

In S201, information indicating that the driver has operated the steering wheel, the accelerator, the brake, or the direction indicator, information indicating the driver's occupancy state detected by a camera or the like, information indicating inattention or dozing, and the like are read from the driver monitoring device 401.

In S202, the occurrence degree of the driver operation is derived using the information read in S201. For example, as illustrated in Table 1 in FIG. 7, the occurrence degree deriving unit 101 of the driver operation determines an occupancy state of the corresponding driver, with information from the driver monitoring device 401 or the like as input, and derives the occurrence degree of the driver operation.

Since S203 to S206 are similar to S101 to S104 in the first embodiment, the description thereof will be omitted.

In S207, an index for defining the accuracy of the future prediction is calculated. The index for defining the accuracy of the future prediction is calculated by weighting the occurrence degree of the driver operation derived in S202, the travel control performance derived in S204, and the sensor detection performance derived in S206, for example, as shown in formula (5) of FIG. 14.

Since S208 is similar to S106 in the first embodiment, the description thereof will be omitted.

In S209, an AEB control activation threshold value is set. The AEB control activation threshold value includes an obstacle determination threshold value Th1, a collision determination threshold value Th2, and a braking start determination threshold value Tth. Since the setting of the braking start determination threshold value Tth is similar to that in S107 in the first embodiment, the description thereof will be omitted.

The obstacle determination threshold value Th1 is, for example, a determination threshold value for obstacle determination set with respect to a relative position between the own vehicle and an object, and when the relative position becomes shorter than the obstacle determination threshold value Th1, the object is determined to be an obstacle. Therefore, when the obstacle determination threshold value Th1 is set to a small value, determination is made that the object is an obstacle at an early stage, and when the obstacle determination threshold value Th1 is set to a large value, whether or not the object is an obstacle is carefully determined.

Figure 8:
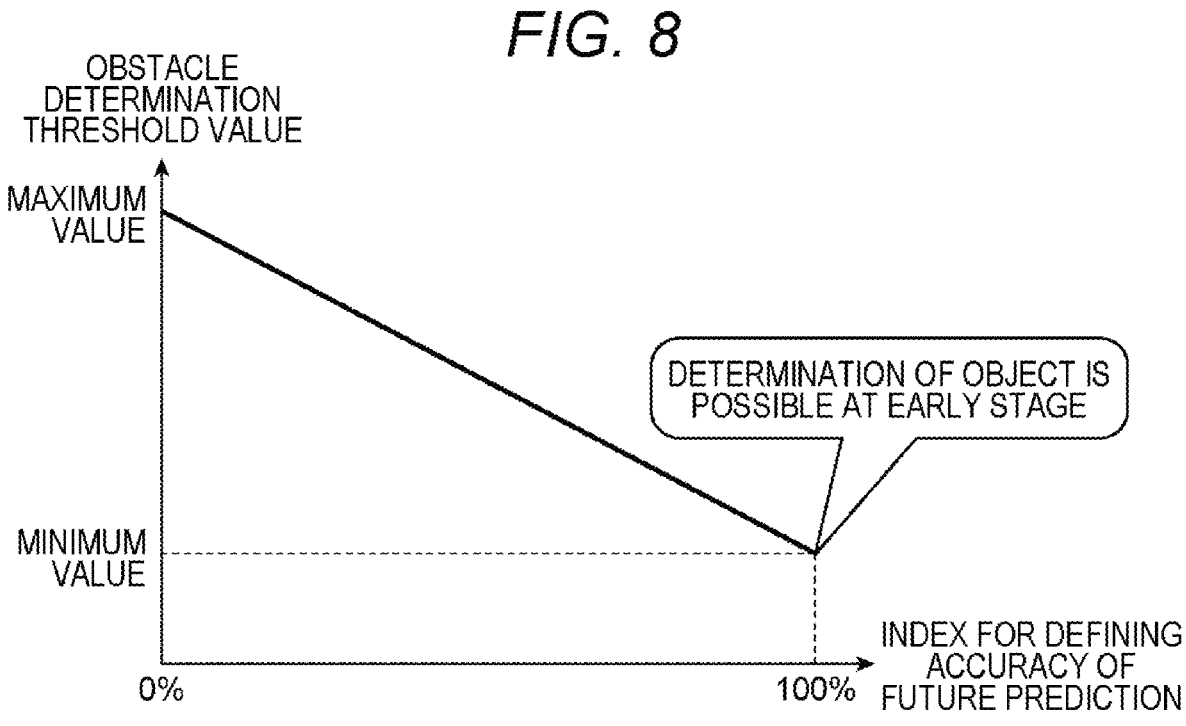
FIG. 8 is a diagram for explaining a setting example of an obstacle determination threshold value.

As illustrated in FIG. 8, the threshold value setting unit 106 sets the obstacle determination threshold value Th1 to a smaller value as the index for defining the accuracy of the future prediction becomes higher. Therefore, for example, an object such as an oncoming vehicle can be determined as an obstacle at an early stage during the full autonomous driving.

On the other hand, the threshold value setting unit 106 sets the obstacle determination threshold value Th1 to a larger value as the index for defining the accuracy of the future prediction becomes lower. Therefore, for example, when the driver operation is intervened, it is possible to delay the determination that the object is to be an obstacle and determine that the object is an obstacle after the own vehicle further approaches the object.

The collision determination threshold value Th2 is, for example, a determination threshold value of the collision possibility set with respect to a difference between the future position of the own vehicle and the future position of the object, and the own vehicle is determined to collide with an obstacle when the difference between the future position (predicted position) of the own vehicle and the future position (predicted position) of the object becomes smaller than the collision determination threshold value Th2. Therefore, when the collision determination threshold value Th2 is set to a large value, it is easy to determine that there is a collision, and when the collision determination threshold value Th2 is set to a small value, it is easy to determine that there is no collision.

Figure 9:
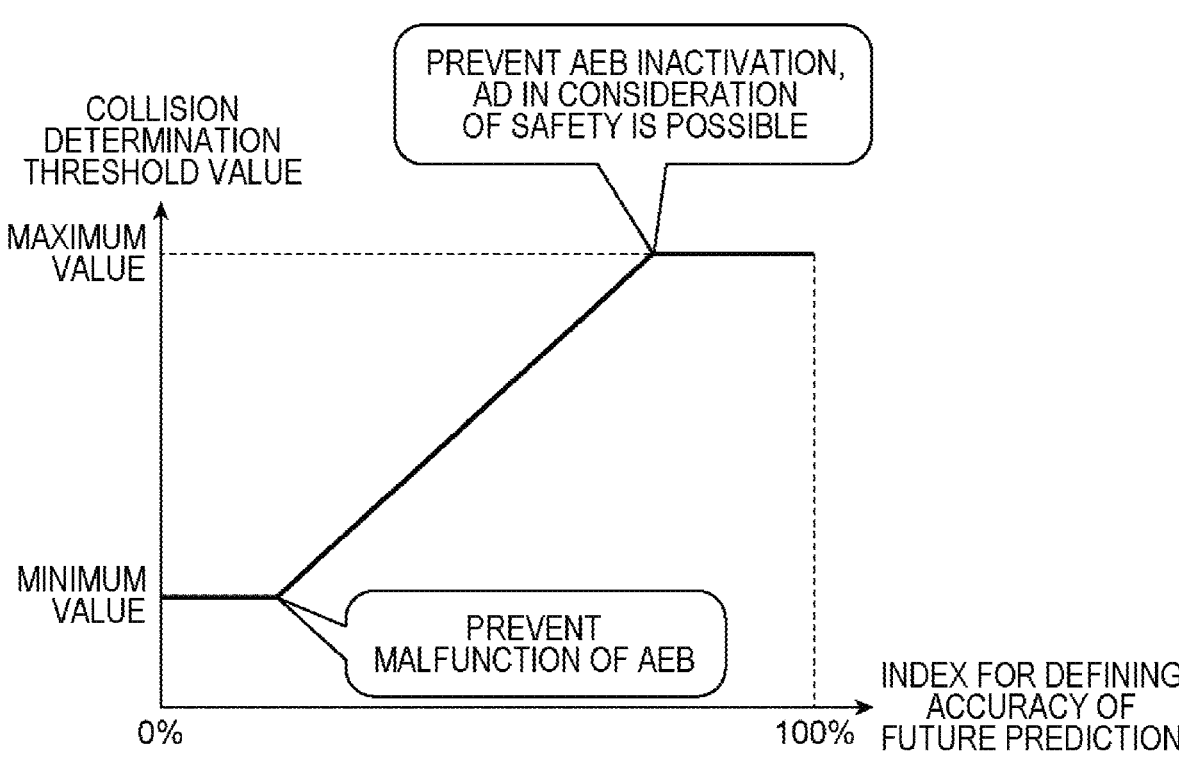
FIG. 9 is a diagram for explaining a setting example of a collision determination threshold value.

As illustrated in FIG. 9, the threshold value setting unit 106 sets the collision determination threshold value Th2 to a larger value as the index for defining the accuracy of the future prediction becomes higher. Therefore, it is possible to prevent inactivation of the AEB and to perform autonomous driving in consideration of safety.

On the other hand, the threshold value setting unit 106 sets the collision determination threshold value Th2 to a smaller value as the index for defining the accuracy of the future prediction becomes lower. Therefore, it is possible to prevent malfunction of the AEB and to prevent an in-vehicle accident due to unnecessary sudden brake.

In S210, whether the object detected by the object detection sensor 411 is an obstacle is determined by using the detection information (relative position, relative speed, lateral width, and type) of the object detection sensor 411 read in S205. In a case where it is determined that the object is an obstacle, the process proceeds to S211 in order to perform the collision determination, and in a case where it is determined that the object is not an obstacle, the present flow is ended. The determination on whether or not the object is an obstacle is performed using the obstacle determination threshold value Th1 set in S209, and for example, when the relative position between the own vehicle and the detected object is less than or equal to the threshold value, the detected object is determined to be an obstacle.

In S211, whether the own vehicle collides with the obstacle is determined using the detection information of the object detection sensor 411 read in S205 and the predicted course of the own vehicle read in S208. Then, in a case where it is determined that there is collision, the process proceeds to S212, and in a case where it is determined that there is no collision, the present flow is ended.

The determination as to whether the own vehicle collides with the obstacle is made using the collision determination threshold value Th2 set in S209. For example, when the difference between the future position of the own vehicle and the future position of the object is smaller than the collision determination threshold value Th2, it is determined that the own vehicle and the object collide with each other.

Since the processes from S212 to S215 are similar to the processes from S110 to S113 of the first embodiment, the description thereof will be omitted.

In the second embodiment described above, the accuracy of the future prediction is calculated in consideration of the occurrence degree of the driver operation (S202) with respect to the first embodiment (S207). Furthermore, in S209, in a case where the index for defining the accuracy of the future prediction is high with respect to S107 of the first embodiment, the AEB inactivation can be prevented and the autonomous driving in consideration of safety can be performed. Then, in a case where the index for defining the accuracy of the future prediction is low, malfunction of the AEB can be prevented.

Although the embodiments of the present invention have been described in detail above, the present invention is not limited to the above embodiments, and various design changes can be made within a range not deviating from the spirit of the present invention described in the claims. For example, the embodiments described above have been described in detail in order to describe the present invention in an easy-to-understand manner, and are not necessarily limited having to those all the described configurations. In addition, a part of the configuration of one embodiment can be replaced with the configuration of another embodiment, and the configuration of another embodiment can be added to the configuration of one embodiment. Furthermore, it is possible to add, delete, and replace other configurations for a part of the configuration of each embodiment.

REFERENCE SIGNS LIST 1 vehicle traveling system
100 braking assistance control device
101 occurrence degree deriving unit of driver operation
102 travel control performance deriving unit
103 sensor detection performance deriving unit
104 predicted course calculating unit
105 index calculating unit
106 threshold value setting unit
107 collision determining unit
108 braking control unit

The invention claimed is:

1. A braking assistance control device that performs a braking assistance control of an own vehicle according to a possibility of collision between the own vehicle and an obstacle, the braking assistance control device comprising:

at least one object detection sensor configured to detect an object around the own vehicle and to output detection information; and a controller comprising at least one processor and at least one non-transitory memory storing instructions that, when executed by the at least one processor, cause the controller to:

calculate an index for defining accuracy of future prediction of relative information between the own vehicle and the obstacle;

set at least one of a plurality of determination threshold values used to determine whether or not to perform the braking assistance control according to the index, the plurality of determination threshold values including a determination threshold value for obstacle determination;

determine an obstacle based on the detection information output by the at least one object detection sensor; and change the determination threshold value for the obstacle determination according to the index such that the determination threshold value for the obstacle determination decreases as the index becomes higher.

2. The braking assistance control device according to claim 1, wherein the instructions, when executed by the at least one processor, further cause the controller to set a determination threshold value for starting braking to a value corresponding to an early activation as the index is higher.

3. The braking assistance control device according to claim 1, wherein the instructions, when executed by the at least one processor, cause the controller to calculate the index based on the occurrence degree of the driver operation.

4. The braking assistance control device according to claim 1, further comprising a driver monitoring sensor configured to output driver monitoring information indicating the occupancy state of the driver, wherein the instructions, when executed by the at least one processor, further cause the controller to derive the information on the occurrence degree of driver operation based on the driver monitoring information.

5. The braking assistance control device according to claim 1, wherein the plurality of determination threshold values further includes a determination threshold value for collision possibility determination and a determination threshold value for braking start determination.

6. The braking assistance control device according to claim 5, wherein the instructions, when executed by the at least one processor, further cause the controller to determine a possibility of collision from a difference between a predicted position of the own vehicle and a predicted position of the obstacle, and to change the determination threshold value for the collision possibility determination according to the index.

7. The braking assistance control device according to claim 5, wherein the instructions, when executed by the at least one processor, further cause the controller to perform a braking start determination based on a collision time between the own vehicle and the obstacle, and to set the determination threshold value for the braking start determination according to the index.

8. The braking assistance control device according to claim 7, wherein the instructions, when executed by the at least one processor, further cause the controller to increase the determination threshold value for the braking start determination as the index becomes higher.

9. The braking assistance control device according to claim 5, wherein the instructions, when executed by the at least one processor, further cause the controller to increase the determination threshold value for the collision possibility determination as the index becomes higher.

10. The braking assistance control device according to claim 1, wherein the instructions, when executed by the at least one processor, cause the controller to:

derive information on an occurrence degree of driver operation based on information on an occupancy state of a driver of the own vehicle;

derive information on travel control performance of the own vehicle from a difference between a current position of the own vehicle and a route of a travel plan set in advance;

derive information on sensor detection performance based on a dispersion state of sensor values of the at least one object detection sensor;

calculate the index based on at least one piece of information of the occurrence degree of the driver operation by the driver of the own vehicle, the travel control performance of the own vehicle, and the sensor detection performance of the at least one object detection sensor; and calculate the index to have higher accuracy of the future prediction when the own vehicle is in autonomous driving than when the own vehicle is in driver operation.

11. The braking assistance control device according to claim 10, wherein the instructions, when executed by the at least one processor, cause the controller to calculate the index based on each of the occurrence degree of the driver operation, the travel control performance of the own vehicle, and the sensor detection performance of the at least one object detection sensor.

12. The braking assistance control device according to claim 1, wherein the instructions, when executed by the at least one processor, cause the controller to calculate the index based on each of the travel control performance of the own vehicle and the sensor detection performance of the at least one object detection sensor.

* * * * *